(12) United States Patent
Rozman et al.

(10) Patent No.: US 9,325,229 B2
(45) Date of Patent: Apr. 26, 2016

(54) GENERATOR ARCHITECTURE WITH PMG EXCITER AND MAIN FIELD ROTATING POWER CONVERTER

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 542 days.

(21) Appl. No.: 13/833,212

(22) Filed: Mar. 15, 2013

(65) Prior Publication Data

US 2014/0265744 A1    Sep. 18, 2014

(51) Int. Cl.
*H02P 9/10*    (2006.01)
*H02P 9/14*    (2006.01)
*H02K 19/36*   (2006.01)
*H02P 9/48*    (2006.01)
*F01D 15/10*   (2006.01)

(52) U.S. Cl.
CPC .............. *H02K 19/365* (2013.01); *H02P 9/48* (2013.01)

(58) Field of Classification Search
USPC ............................................... 322/59; 290/52
See application file for complete search history.

(56) References Cited

U.S. PATENT DOCUMENTS

| | | | |
|---|---|---|---|
| 3,671,850 A | 6/1972 | Mehnert et al. | |
| 3,768,002 A | 10/1973 | Drexler | |
| 3,908,161 A * | 9/1975 | Messenger | H02K 19/00 290/38 R |
| 4,393,345 A | 7/1983 | Fork | |
| 4,463,295 A * | 7/1984 | Musil | H02P 1/46 318/436 |
| 4,480,204 A | 10/1984 | Kuter | |
| 4,625,160 A | 11/1986 | Hucker | |
| 4,694,654 A * | 9/1987 | Kawamura | F02B 37/005 290/52 |
| 4,723,106 A | 2/1988 | Gibbs | |
| 5,029,263 A | 7/1991 | Rozman | |
| 5,055,765 A | 10/1991 | Rozman et al. | |
| 5,068,590 A * | 11/1991 | Glennon | F02N 11/04 290/38 R |
| 5,097,195 A * | 3/1992 | Raad | F02N 11/04 290/38 R |
| 5,233,286 A | 8/1993 | Rozman et al. | |
| 5,309,081 A * | 5/1994 | Shah | F02N 11/04 290/46 |
| 5,325,043 A | 6/1994 | Parro | |
| 5,430,362 A * | 7/1995 | Carr | F02N 11/04 318/139 |
| 5,488,286 A | 1/1996 | Rozman et al. | |
| 5,493,200 A * | 2/1996 | Rozman | H02P 9/08 322/10 |
| 5,594,322 A * | 1/1997 | Rozman | F02N 11/04 318/400.12 |
| 6,095,268 A * | 8/2000 | Jones, Jr. | B60K 1/02 180/22 |
| 6,420,842 B1 | 7/2002 | Gold | |
| 6,701,803 B1 * | 3/2004 | Tamai | F16H 49/001 74/640 |
| 6,707,184 B2 * | 3/2004 | Kusase | H02J 7/1484 310/40 R |

(Continued)

FOREIGN PATENT DOCUMENTS

WO    00/67355    11/2000
WO    00/67358    11/2000

OTHER PUBLICATIONS

Extended European Search Report dated Feb. 18, 2016, for corresponding European Application No. 141592105.

*Primary Examiner* — Pedro J Cuevas
(74) *Attorney, Agent, or Firm* — Kinney & Lange, P.A.

(57) ABSTRACT

A generator includes a stationary portion and a rotating portion. The stationary portion includes a permanent magnet and a main armature winding. The rotating portion includes a main field winding and a main field rotating power converter that regulates current through the main field winding.

18 Claims, 2 Drawing Sheets

(56) References Cited

U.S. PATENT DOCUMENTS

| | | | |
|---|---|---|---|
| 6,998,726 B2* | 2/2006 | Sarlioglu | F02N 11/0859 290/31 |
| 7,064,524 B2 | 6/2006 | Yao | |
| 7,282,893 B2 | 10/2007 | Yao | |
| 8,199,585 B2 | 6/2012 | Marquart | |
| 8,294,401 B2* | 10/2012 | Pollock | H02P 6/10 318/400.32 |
| 8,299,762 B2* | 10/2012 | Rozman | H02M 3/156 318/801 |
| 8,427,116 B2* | 4/2013 | Rozman | H02M 3/156 322/37 |
| 8,471,510 B2* | 6/2013 | Pollock | H02P 6/10 318/400.34 |
| 9,172,278 B2* | 10/2015 | Nakano | H02K 1/148 |
| 9,209,741 B2* | 12/2015 | Gao | F02N 11/04 |
| 2002/0047353 A1* | 4/2002 | Kusase | H02J 7/1484 310/68 B |
| 2004/0108726 A1* | 6/2004 | Sarlioglu | F02N 11/0859 290/38 R |
| 2006/0043939 A1 | 3/2006 | Namuduri et al. | |
| 2010/0226159 A1 | 9/2010 | Stern | |
| 2010/0256782 A1 | 10/2010 | Dai | |
| 2010/0301789 A1* | 12/2010 | Pollock | H02P 25/083 318/400.23 |
| 2010/0308582 A1* | 12/2010 | Rozman | H02M 3/156 290/31 |
| 2011/0012461 A1* | 1/2011 | Tomigashi | H02K 1/276 310/156.01 |
| 2011/0018272 A1* | 1/2011 | Lehoczky | F03B 17/061 290/52 |
| 2011/0037422 A1* | 2/2011 | Pollock | H02P 6/10 318/400.34 |
| 2012/0153904 A1 | 6/2012 | Albsmeier | |
| 2012/0217920 A1 | 8/2012 | Singh | |
| 2013/0033038 A1* | 2/2013 | Rozman | H02M 3/156 290/31 |
| 2015/0244303 A1* | 8/2015 | Gao | F02N 11/04 290/32 |
| 2015/0333586 A1* | 11/2015 | Hirotani | H02K 29/03 310/68 D |
| 2015/0333600 A1* | 11/2015 | Nakano | H02K 11/0021 310/71 |
| 2015/0357892 A1* | 12/2015 | Nakano | H02K 21/14 180/443 |

* cited by examiner

GENERATOR ARCHITECTURE WITH PMG EXCITER AND MAIN FIELD ROTATING POWER CONVERTER

CROSS-REFERENCE TO RELATED APPLICATION(S)

Reference is made to application Ser. No. 13/836,255 entitled "Method of Controlling Rotating Main Field Converter", application Ser. No. 13/835,089 entitled "Variable Speed Constant Frequency System with Generator and Rotating Power Converter", application Ser. No. 13/836,428 entitled "EPGS Architecture with Multi-Channel Synchronous Generator and Common Field Regulated Exciter", application Ser. No. 13/836,007 entitled "EPGS Architecture with Multi-Channel Synchronous Generator and Common Unregulated PMG Exciter", and application Ser. No. 13/833,809 entitled "Generator Architecture with Main Field Rotating Power Converter" which are filed on even date herewith and are assigned to the same assignee as this application.

BACKGROUND

The present invention is related to generator architectures and in particular to generator architectures utilizing main field rotating power converters.

In the simplest terms, generators convert mechanical energy to electrical energy via the interaction of rotating magnetic fields and coils of wire. A multitude of generator architectures have been developed with various means of providing interaction magnetic fields and coils of wire. For example, a permanent magnet generator (PMG) utilizes permanent magnets to generate a constant magnetic field, which is rotated via the mechanical energy supplied by a prime mover such that the rotating magnetic field interacts with the stator coils to provide an output voltage. Another type of generator supplies current through a coil to generate the desired magnetic field, which is rotated via the mechanical energy supplied by a prime mover, such that a rotating magnetic field is created that interacts with stator coils to provide an output voltage.

In the former example, the output voltage supplied by the PMG depends only on the magnitude of the mechanical energy supplied by the prime mover. In the latter example, the output voltage of the generator can be regulated by varying the current supplied to the field coil. For applications in which the output voltage must be regulated, the latter example, known as a wound field synchronous machine, is widely utilized. However, permanent magnets offer advantages over excitation provided via an exciter winding. The key drawback to permanent magnets is that magnetic flux provided by the permanent magnets is constant, unlike an exciter coil in which the magnetic flux can be regulated by increasing or decreasing the current through the exciter coil. Permanent magnets would therefore be useful in a number of generator applications if a form of regulation could be introduced.

SUMMARY

A generator includes a stationary portion and a rotating portion. The stationary portion includes a permanent magnet and a main armature winding. The rotating portion includes a main field winding and a main field rotating power converter that regulates current through the main field winding.

DETAILED DESCRIPTION

Figure 1:
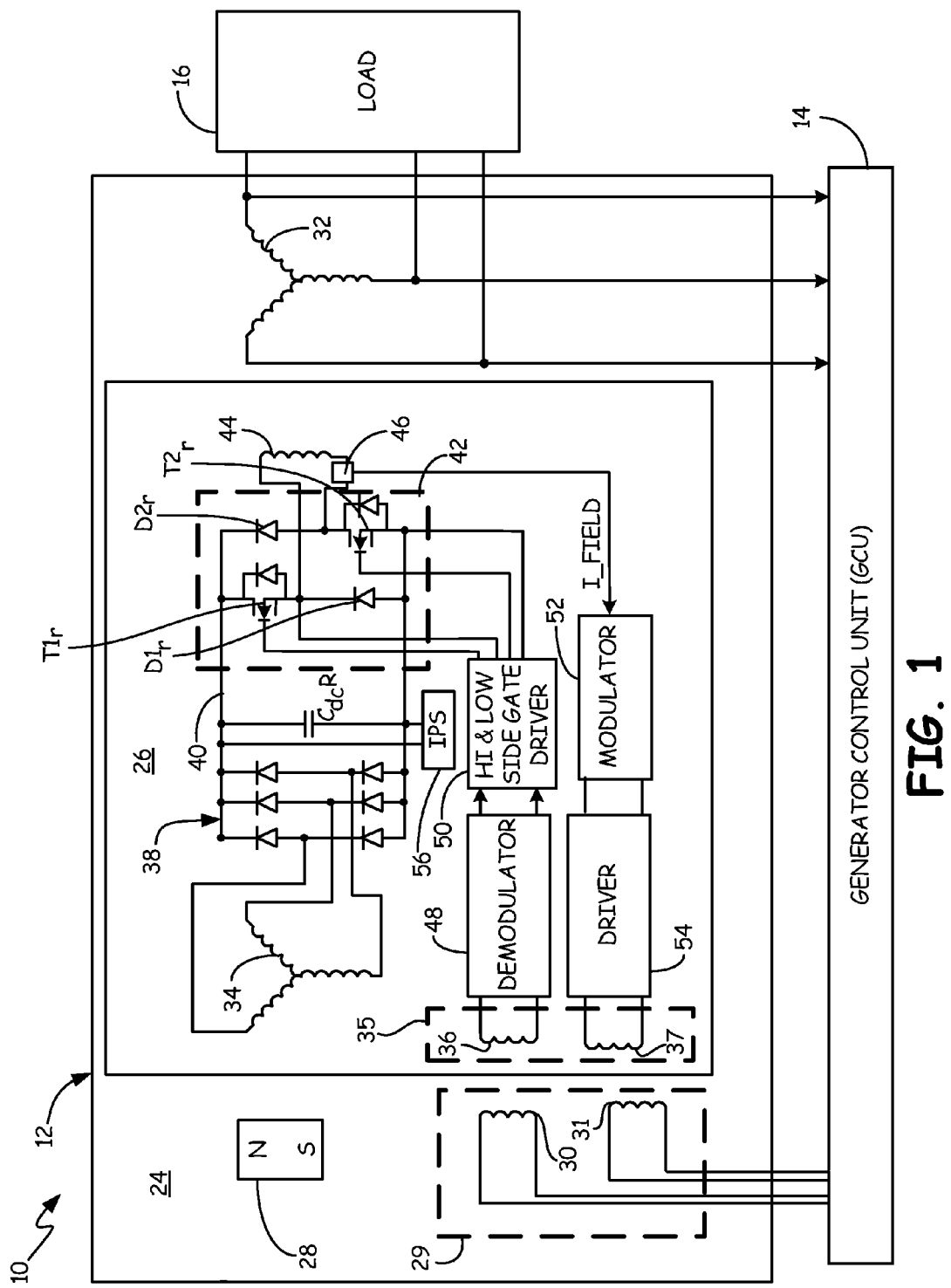
FIG. 1 is a circuit diagram of an electric power generation and distribution system according to an embodiment of the present invention.

FIG. 1 is a circuit diagram of electric power generation and distribution system 10 according to an embodiment of the present invention. System 10 includes generator 12, generator control unit (GCU) 14, and load 16. Generator 12 is divided into stationary portion 24 and rotating portion 26. Stationary portion 24 includes permanent magnet 28, stationary communication module 29, and main armature windings 32. Rotating portion 26 includes exciter armature windings 34, rotating communication module 35, rectifier 38, direct current (DC) link capacitor CdcR, DC link bus 40, main field rotating power converter 42, main field winding 44, current sensor 46, demodulator 48, gate drive circuit 50, modulator 52, drive circuit 54, and internal power supply (IPS) 56

Generator control unit (GCU) 14 is responsible for regulation and protection of generator 12. Regulation refers to maintaining the output voltage of generator 12 provided by main armature winding 32 at a desired level. Protection refers, at least in part, to preventing faults such as overvoltage faults from damaging generator 12 or attached loads 16. A typically wound field synchronous generator utilizes an exciter field winding in place of permanent magnets 28 to provide excitation to rotating portion 26. The excitation provided to the exciter field winding can be regulated to control the output voltage generated by main armature winding 32. In contrast, in the embodiment shown in FIG. 1, permanent magnet 28 is employed to provide excitation to rotating portion 26. The magnetic flux generated by permanent magnet 28 is constant. Rotation of rotating portion 26 causes exciter armature windings 34 to cut through the constant magnetic flux provided by stationary permanent magnet 28, inducing an alternating current voltage on exciter armature winding 34. As a result, voltage induced by permanent magnet 28 in PMG windings 34 is a function of generator speed, and therefore cannot be regulated by GCU 14. Despite the lack of control over the magnitude of the voltage induced on PMG windings 34, the output voltage generated on main armature winding 32 is regulated by controlling the current through main field winding 44 via main field rotating power converter 42.

Regulation of the output voltage via control of the current supplied to main field winding 44 requires communication of commands/instructions/feedback across the air gap separating stationary portion 24 from rotating portion 26. Likewise, overvoltage protection is provided by communicating commands/instructions across the air gap separating stationary portion 24 from rotating portion 26. As discussed in more detail below, based on the received instructions/commands, main field rotating power converter 42 selectively applies voltage to main field winding 44.

In the embodiment shown in FIG. 1, GCU 14 is connected to monitor the output voltage provided by main armature winding 32 and communicate commands, instructions, and/or feedback to rotating portion 26 of generator 12 via stationary communication module 29. Permanent magnet 28 induces a voltage in PMG windings 34 located on rotating portion 26. The AC voltage generated on exciter armature winding 34 is rectified by rectifier 38 and DC link capacitor CdcR to a DC voltage that is supplied to main field rotating power converter 42 via DC link bus 40. In the embodiment shown in FIG. 1, rectifier 38 is a passive rectifier comprised of a plurality of bridge-connected diodes. In other embodiments, rectifier 38 may be an active rectifier in which the diodes are replaced with a plurality of solid-state switches selectively controlled to provide a DC output to main field rotating power converter 42. Main field rotating power converter 42 selectively applies voltage from DC link 40 to main field winding 44, allowing current to build up in main field winding 44 when main field rotating power converter 42 is On and dissipating current in main field winding 44 when main field rotating power converter 42 is Off. Current through main field winding 44 induces an AC voltage in main armature winding 32 that is monitored by GCU 14 and supplied to load 16.

In the embodiment shown in FIG. 1, main field rotating power converter 42 includes high-side switch T1r, low-side switch T2r, high-side diode D1r and low-side diode D2r. When switches T1r and T2r are both turned On then the positive DC voltage provided by rotating rectifier is applied to main field winding 94 and allows current to build up in main field winding 94. In particular, a conductive current path is created from the DC output of rotating rectifier 90 through switch T1r to main field winding 94, and then through switch T2r. In response to an overvoltage condition, in which it is desirable to dissipate the main field winding current as quickly as possible, both switches T1r and T2r are turned Off. When switches T1r and T2r are Off, no conductive path between the positive rail of DC link 40 and the high-side of main field winding 44 or between the negative rail of DC link 40 and the low-side of main field winding 44. As a result, the main field current flows through diodes D1r and D2r and voltage across main field winding 44 becomes negative. As a result, the main field current rapidly decreases to zero as the inductive energy is fed back to rotating power supply components including capacitor CdcR.

In one embodiment, to regulate current through main field winding 44, low-side switch T2r is maintained in the On state, while high-side switch T1r is pulse width modulated to regulate the overall current supplied to main field winding 44. In this way, the current through main field winding 44 is regulated to a desired value, such that the output voltage generated by main armature windings 32 is regulated to a desired value.

To regulate the output voltage of generator 12 via a current located on rotating portion 26, communication between generator control unit 14 and rotating portion 26 is required. In the embodiment shown in FIG. 1, stationary communication module 28 includes first primary winding 30, second primary winding 31. Rotating communication module 35 includes first secondary winding 36 and second secondary winding 39, wherein first secondary winding 36 is coupled to receive instructions, commands, etc from GCU 14. Received instructions, commands, etc., are communicated to main field rotating power converter 42 via demodulator 48 and high/low gate drive circuit 50. Based on the received commands, switches T1r and T2r are selectively turned On and Off to regulate the current through main field winding 44. In the embodiments shown FIG. 1, feedback regarding the current through main field winding 44 that is collected by current sensor 46 is communicated to stationary portion 24 via modulator circuit 52, driver circuit 54 and second secondary winding 39.

The monitored current through main field winding 44 is communicated back to GCU 14, which utilizes the monitored current as part of the voltage regulation algorithm to determine whether to increase or decrease the current through main field winding. For example, GCU 14 monitors the voltage provided by main armature winding 32 and compares the monitored voltage with a reference voltage. The result of the comparison generates a reference current that represents the desired current through main field winding 44 that would minimize the difference between the monitored output voltage and the desired output voltage. This reference current is I_ref is compared with the monitored main field winding current I_Field. The result of the comparison determines the control signal supplied to main field rotating power converter 42. The control signal (e.g., On/Off signals) generated by GCU 14 are communicated to main field rotating power converter 42 via first primary winding 30, first secondary winding 36, demodulator 48 and high-side/low-side gate driver circuit 50. In this way, regulation of the generator output voltage is done via bi-directional communication between the rotating portion of generator 12 and GCU 14. In the embodiment shown in FIG. 1, regulation is the responsibility of GCU 14, with rotation portion 26 only responsible for communicating measured parameters (e.g., monitored main field winding current) to GCU 14 and being capable of receiving commands from GCU 14.

Figure 2:
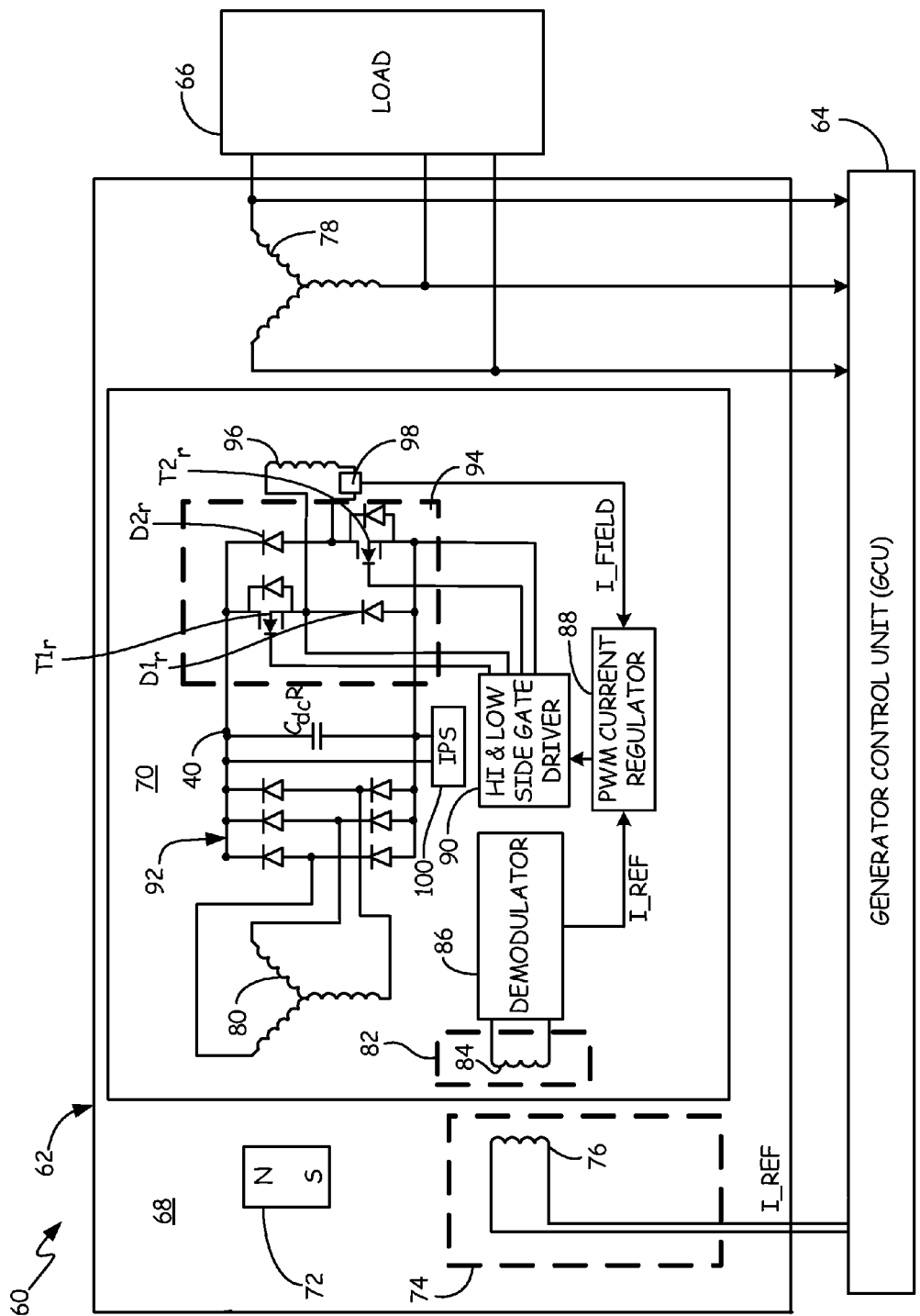
FIG. 2 is a circuit diagram of an electric power generation and distribution system according to another embodiment of the present invention.

FIG. 2 is a circuit diagram of a electric power generation and distribution system 60 according to an embodiment of the present invention. System 60 includes generator 62, generator control unit (GCU) 64, and load 66. Generator 62 includes stationary portion 68 and rotating portion 70. Stationary portion 68 includes permanent magnet 72, stationary communication module 74, which includes stationary coil 76, and main armature winding 78. Rotating portion 70 includes exciter armature winding 80, rotating communication module 82, which includes rotating coil 84, demodulator 86, PWM current regulator 88, high-side/low-side gate driver 90, rotating rectifier 92, main field rotating power converter 94, main field winding 96, current sensor 98, and internal power supply (IPS) 100. In the embodiment shown in FIG. 2, main field rotating power converter is once again implemented with high-side switch T1r, low-side switch T2r and diodes D1r, D2r connected in an asymmetric H-bridge configuration. In other embodiments, various other circuit configurations may be employed to selectively control the supply of current to main field winding. Similarly, in the embodiment shown in FIG. 2, stationary communication module 74 and rotating communication module 82 utilize inductively coupled coils 76 and 84 to transmit information bi-directionally across the airgap. However, in other embodiments other well known means of communicating between a stationary component and a rotating component may be employed.

Once again, permanent magnets 72 located on the stationary portion 68 of generator 62 induces a voltage in exciter armature winding 80. The voltage induced in exciter armature winding 80 is speed dependent, because the magnetic field generated by permanent magnet 72 cannot be modified. Rotating rectifier 92 rectifies the AC voltage induced on exciter armature winding 80 and provides a DC voltage to main field rotating power converter 94 via DC link bus 93.

In contrast with the embodiment shown in FIG. 1, in which the current I_field monitored through the main field winding was communicated to the GCU for regulation calculations, in the embodiment shown in FIG. 2, rotating portion 70 includes PWM current regulator 88 to provide regulation of the main field winding current. A benefit of this approach is the monitored current I_field does not have to be communicated across the air gap to the GCU, with command instructions subsequently provided by the GCU in response to the monitored current.

In the embodiment shown in FIG. 2, GCU 64 monitors the output voltage of main armature winding 78. Based on the monitored output voltage, GCU 64 generates a main field winding reference current (labeled I_ref) that is communicated to rotating portion 70 via transformer windings 76 and 84. Demodulator 86 demodulates the signal received at secondary winding 84 and provides the received reference current I_ref to PWM current regulator 88, which compares the reference current I_ref to monitored current I_Field. Based on the comparison, PWM current regulator 88 generates command signals provided to high-side/low-side gate driver 90 to selectively turn high-side switch T1r and low-side switch T2r On and Off. During normal operation, switch T2r is normally maintained in the On state, while switch T1r is pulse width modulated to generate the desire current through main field winding 96. In addition, during overvoltage conditions, both switches T1r and T2r may be turned Off to provide protection to generator 62 by quickly dissipating the current from main field winding 96.

In this way, the present inventions provide an architecture in which permanent magnets can be used to excite the generator, while still allowing for regulation of the output voltage provided by the generator.

DISCUSSION OF POSSIBLE EMBODIMENTS

The following are non-exclusive descriptions of possible embodiments of the present invention.

A generator includes a stationary portion and a rotating portion. The stationary portion includes a permanent magnet and a main armature winding. The rotating portion includes a main field winding and a main field rotating power converter that regulates current through the main field winding.

The generator of the preceding paragraph can optionally include, additionally and/or alternatively, any one or more of the following features, configurations and/or additional components:

In any of the foregoing embodiments, the main field rotating power converter may further include a high-side switch connected between a positive DC voltage of a DC bus link and a high side of the main field winding, a low-side switch connected between a negative DC voltage of the DC bus link and a low side of the main field winding, a first diode connected between the high side of the main field winding and the negative DC voltage, and a second diode connected between the low side of the main field winding and the positive DC voltage In any of the foregoing embodiments, the low-side switch may be turned On and the high-side switch may be modulated On and Off to regulate the current through the main field winding.

In any of the foregoing embodiments, the stationary communication module is located on the stationary portion and the rotating communication module located on the rotating portion may be coupled to receive input from the stationary communication module, wherein the rotating communication module may communicate instructions received from the stationary communication module to the main field rotating power converter to regulate the current through the main field winding.

In any of the foregoing embodiments, the stationary communication module may include a first primary winding and a second primary winding and the rotating communication module includes a first secondary winding and a second secondary winding, wherein the first primary winding is inductively coupled with the first secondary winding to communicate instructions from the stationary portion to the rotating portion and the second primary winding is inductively coupled with the second secondary winding to communicate feedback from the rotating portion to the stationary portion.

In any of the foregoing embodiments, the generator may include a demodulator, a gate drive circuit, a current sensor, a modulator, and a driver circuit. The demodulator may be coupled to demodulate instructions communicated via the first primary winding and the first secondary winding. The gate drive circuit may control the state of the main field rotating power converter based on the demodulated instructions. The current sensor may monitor current through the main field winding. The modulator may modulate the sensed current, and the driver circuit may be coupled to the second secondary winding to communicate the modulated sensed current as feedback from the rotating portion to the stationary portion via second secondary winding and the second primary winding.

In any of the foregoing embodiments, the main field rotating power converter may includes a high-side switch connected between a positive DC voltage of a DC link bus and a high side of the main field winding, a low-side switch connected between a negative DC voltage of the DC link bus and a low side of the main field winding, a first diode connected between the high side of the main field winding and the negative DC voltage, and a second diode connected between the low side of the main field winding and the positive DC voltage, wherein current through the main field winding is regulated by maintaining the low-side switch in an On state and pulse width modulating the high-side switch based on demodulated instructions received via the first primary winding and the first secondary winding.

In any of the foregoing embodiments, the stationary communication module may include a primary winding and the rotating communication module may include a secondary winding inductively coupled to the primary winding.

In any of the foregoing embodiments, a demodulator may be coupled to the secondary winding to demodulate instructions received from the primary winding, including a reference current representing a desired current to be provided through the main field winding, and a pulse-width modulator (PWM) current regulator may be connected to monitor current through the main field winding and compare the monitored current to the reference current to calculated PMW control signals provided to the main field rotating power converter to selectively apply the DC voltage to the main field winding.

A generator system may include a generator, a stationary communication module, a rotating communication module, a generator control unit, and a main field rotating power converter. The generator may include a stationary portion and a rotating portion, wherein the generator includes permanent magnets located on the stationary portion to provide excitation to the rotating portion, and a main field winding on the rotating portion that induces a generator output voltage on a main armature winding located on the stationary portion. The rotating communication module located on the rotating portion of the generator may be configured to receive communications from the stationary communication module. The generator control unit may be connected to monitor the output voltage generated by the main armature winding of the generator and to provide instructions via the stationary communication module to the rotating portion of the generator. The main field rotating power converter located on the rotating portion of the generator that may, in response to instructions received from the GCU, regulate current through the main field winding to regulate the output voltage of the generator.

The generator system of the preceding paragraph can optionally include, additionally and/or alternatively, any one or more of the following features, configurations and/or additional components:

In any of the foregoing embodiments, in response to monitored output voltage of the generator, the generator control unit may provide instructions to the rotating portion of the generator to selectively turn main field rotating power converter On and Off to regulate current through the main field winding.

In any of the foregoing embodiments, in response to monitored output voltage of the generator, the generator control unit may provide a current reference value to the rotating portion of the generator, wherein the rotating portion includes a pulse-width modulation current regulator that selectively turns the main field rotating power converter On and Off to regulate the current through the main field winding.

In any of the foregoing embodiments, wherein the main field rotating power converter may includes a high-side switch connected between a positive DC voltage of a DC bus link and a high side of the main field winding, a low-side switch connected between a negative DC voltage of the DC bus link and a low side of the main field winding, a first diode connected between the high side of the main field winding and the negative DC voltage, and a second diode connected between the low side of the main field winding and the positive DC voltage.

In any of the foregoing embodiments, the low-side switch may be turned On and the high-side switch may be modulated On and Off to regulate the current through the main field winding.

In any of the foregoing embodiments, the generator system may further include an exciter armature winding located on the rotating portion that provides an alternating current (AC) voltage in response to the permanent magnets and a rotating rectifier that rectifies the AC voltage provided by the exciter armature winding to a direct current (DC) voltage provided to the main field rotating power converter via a DC link bus, wherein the main field rotating power converter selectively applies voltage from the DC link bus to the main field winding to develop current through the main field winding.

In any of the foregoing embodiments, the stationary communication module may include a primary winding and the rotating communication module may include a secondary winding inductively coupled with the primary winding to allow the generator control unit to provide control instructions to the rotating portion.

In any of the foregoing embodiments, the stationary communication module may include a first primary winding and a second primary winding and the rotating communication module may include a first secondary winding inductively coupled with the first primary winding and a second secondary winding inductively coupled with the second primary winding, wherein the generator control unit sends control instructions to the rotating portion via the first primary winding and receives feedback from the rotating portion via the second primary winding.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A generator comprising:
    a stationary portion that includes a permanent magnet and a main armature winding;
    a rotating portion that includes a main field winding and a main field rotating power converter that regulates current through the main field winding
    a stationary communication module located on the stationary portion; and
    a rotating communication module located on the rotating portion that is coupled to receive input from the stationary communication module, wherein the rotating communication module communicates instructions received from the stationary communication module to the main field rotating power converter to regulate the current through the main field winding.

2. The generator of claim 1, wherein the main field rotating power converter includes:
    a high-side switch connected between a positive DC voltage of a DC bus link and a high side of the main field winding;
    a low-side switch connected between a negative DC voltage of the DC bus link and a low side of the main field winding;
    a first diode connected between the high side of the main field winding and the negative DC voltage; and
    a second diode connected between the low side of the main field winding and the positive DC voltage.

3. The generator of claim 2, wherein the low-side switch is turned On and the high-side switch is modulated On and Off to regulate the current through the main field winding.

4. The generator of claim 1, wherein the stationary communication module includes a first primary winding and a second primary winding and the rotating communication module includes a first secondary winding and a second secondary winding, wherein the first primary winding is inductively coupled with the first secondary winding to communicate instructions from the stationary portion to the rotating portion and the second primary winding is inductively coupled with the second secondary winding to communicate feedback from the rotating portion to the stationary portion.

5. The generator of claim 4, further including:
    a demodulator coupled to demodulate instructions communicated via the first primary winding and the first secondary winding;
    a gate drive circuit that controls the state of the main field rotating power converter based on the demodulated instructions;
    a current sensor that monitors current through the main field winding;
    a modulator that modulates the sensed current; and
    a driver circuit coupled to the second secondary winding to communicate the modulated sensed current as feedback from the rotating portion to the stationary portion via second secondary winding and the second primary winding.

6. The generator of claim 5, wherein the main field rotating power converter includes:
    a high-side switch connected between a positive DC voltage of a DC link bus and a high side of the main field winding;
    a low-side switch connected between a negative DC voltage of the DC link bus and a low side of the main field winding;
    a first diode connected between the high side of the main field winding and the negative DC voltage; and
    a second diode connected between the low side of the main field winding and the positive DC voltage, wherein current through the main field winding is regulated by maintaining the low-side switch in an On state and pulse width modulating the high-side switch based on demodulated instructions received via the first primary winding and the first secondary winding.

7. The generator of claim 4, wherein the stationary communication module includes a primary winding and the rotating communication module includes a secondary winding inductively coupled to the primary winding.

8. The generator of claim 7, further including:
a demodulator coupled to the secondary winding to demodulate instructions received from the primary winding, including a reference current representing a desired current to be provided through the main field winding; and
a pulse-width modulator (PWM) current regulator connected to monitor current through the main field winding and compare the monitored current to the reference current to calculated PMW control signals provided to the main field rotating power converter to selectively apply the DC voltage to the main field winding.

9. A generator system comprising:
a generator having a stationary portion and a rotating portion, wherein the generator includes permanent magnets located on the stationary portion to provide excitation to the rotating portion, and a main field winding on the rotating portion that induces a generator output voltage on a main armature winding located on the stationary portion;
a stationary communication module located on the stationary portion of the generator;
a rotating communication module located on the rotating portion of the generator and configured to receive communications from the stationary communication module;
a generator control unit connected to monitor the output voltage generated by the main armature winding of the generator and to provide instructions via the stationary communication module to the rotating portion of the generator; and
a main field rotating power converter located on the rotating portion of the generator that in response to instructions received from the GCU regulates current through the main field winding to regulate the output voltage of the generator.

10. The generator system of claim 9, wherein in response to monitored output voltage of the generator, the generator control unit provides instructions to the rotating portion of the generator to selectively turn main field rotating power converter On and Off to regulate current through the main field winding.

11. The generator system of claim 9, wherein in response to monitored output voltage of the generator, the generator control unit provides a current reference value to the rotating portion of the generator, wherein the rotating portion includes a pulse-width modulation current regulator that selectively turns the main field rotating power converter On and Off to regulate the current through the main field winding.

12. The generator system of claim 9, wherein the main field rotating power converter includes:
a high-side switch connected between a positive DC voltage of a DC bus link and a high side of the main field winding;
a low-side switch connected between a negative DC voltage of the DC bus link and a low side of the main field winding;
a first diode connected between the high side of the main field winding and the negative DC voltage; and
a second diode connected between the low side of the main field winding and the positive DC voltage.

13. The generator of claim 12, wherein the low-side switch is turned On and the high-side switch is modulated On and Off to regulate the current through the main field winding.

14. The generator of claim 9, further including:
an exciter armature winding located on the rotating portion that provides an alternating current (AC) voltage in response to the permanent magnets; and
a rotating rectifier that rectifies the AC voltage provided by the exciter armature winding to a direct current (DC) voltage provided to the main field rotating power converter via a DC link bus, wherein the main field rotating power converter selectively applies voltage from the DC link bus to the main field winding to develop current through the main field winding.

15. The generator of claim 9, wherein a stationary communication module includes a primary winding and the rotating communication module includes a secondary winding inductively coupled with the primary winding to allow the generator control unit to provide control instructions to the rotating portion.

16. The generator of claim 9, wherein the stationary communication module includes a first primary winding and a second primary winding and the rotating communication module includes a first secondary winding inductively coupled with the first primary winding and a second secondary winding inductively coupled with the second primary winding, wherein the generator control unit sends control instructions to the rotating portion via the first primary winding and receives feedback from the rotating portion via the second primary winding.

17. A generator comprising:
a stationary portion that includes a permanent magnet and a main armature winding;
a rotating portion that includes a main field winding and a main field rotating power converter that regulates current through the main field winding;
a high-side switch connected between a positive DC voltage of a DC bus link and a high side of the main field winding;
a low-side switch connected between a negative DC voltage of the DC bus link and a low side of the main field winding;
a first diode connected between the high side of the main field winding and the negative DC voltage; and
a second diode connected between the low side of the main field winding and the positive DC voltage.

18. The generator of claim 17, wherein the low-side switch is turned On and the high-side switch is modulated On and Off to regulate the current through the main field winding.

* * * * *